(12) United States Patent
Euley et al.

(10) Patent No.: US 6,558,056 B2
(45) Date of Patent: May 6, 2003

(54) BARRIER FREE COMPUTER KEYBOARD

(76) Inventors: David V. Euley, 17202 N. 54th St., Scottsdale, AZ (US) 85254; Phyllis A. Euley, 17202 N. 54th St., Scottsdale, AZ (US) 85254

( * ) Notice: Subject to any disclaimer, the term of this patent is extended or adjusted under 35 U.S.C. 154(b) by 0 days.

(21) Appl. No.: 09/847,452

(22) Filed: May 2, 2001

(65) Prior Publication Data

US 2001/0038766 A1 Nov. 8, 2001

Related U.S. Application Data

(60) Provisional application No. 60/202,067, filed on May 5, 2000.

(51) Int. Cl.[7] .................................................. B41J 5/10
(52) U.S. Cl. ........................................ 400/489; 400/490
(58) Field of Search ................................. 400/483, 489, 400/490, 472

(56) References Cited

U.S. PATENT DOCUMENTS

| | | | | | |
|---|---|---|---|---|---|
| 1,385,356 A | * | 7/1921 | Bates | .......................... | 400/494 |
| 4,084,214 A | * | 4/1978 | Eppich | .......................... | 16/267 |
| 5,286,125 A | * | 2/1994 | DiGiosia | ..................... | 400/472 |
| 5,336,002 A | * | 8/1994 | Russo | .......................... | 400/476 |
| 6,094,156 A | * | 7/2000 | Henty | .................... | 340/825.69 |

* cited by examiner

Primary Examiner—Daniel J. Colilla
(74) Attorney, Agent, or Firm—Paul M. Denk

(57) ABSTRACT

An improved computer keyboard including a series of non-redundant keys. Each key has greater overall dimensions and a concave surface. Each key is spaced apart from the adjacent keys by separating partitions that extend up above the height of each key to facilitate the guidance of the user's fingers during usage.

2 Claims, 2 Drawing Sheets

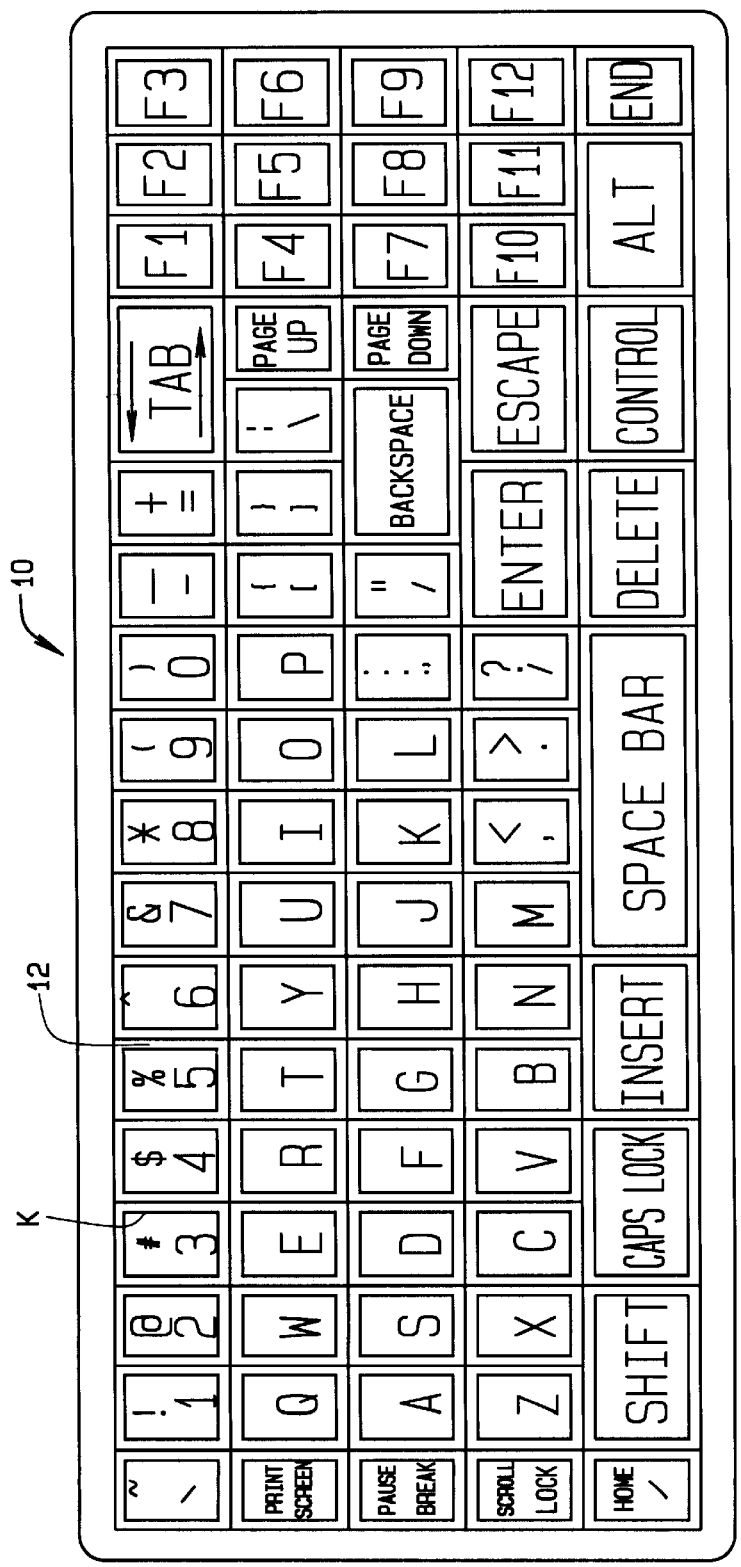
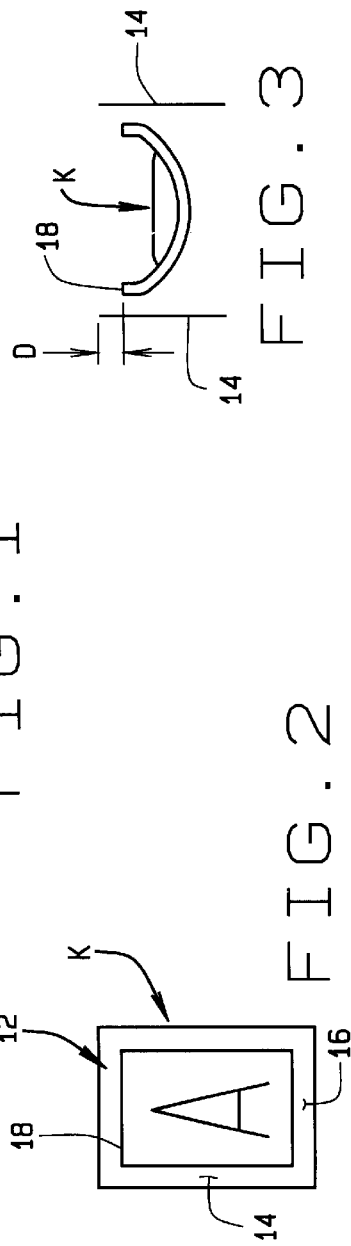
FIG. 1
FIG. 2
FIG. 3

BARRIER FREE COMPUTER KEYBOARD

CROSS REFERENCE TO RELATED APPLICATIONS

This application claims priority to provisional application Ser. No. 60/202,067, filed May 5, 2000.

BACKGROUND OF THE INVENTION

This invention relates generally to the application of a computer particularly by persons having physical impairment that makes it difficult for their usage of the standard computer keyboard, and more specifically, relates to a keyboard for use with the computer, or other instrument, and which greatly facilitates the usage and application of the keyboard by a person with physical disabilities.

The purpose of this current invention is not to replace the traditional typist type of keyboards readily available in the art, but rather to furnish a modified keyboard that will aid persons with hand problems, or other body dysfunctions, in the efficient use of a keyboard. Obviously, computers have become a necessary part of contemporary life, and persons that have been unable to gain or attain access to their full usage have been excluded from participating in one of society's more significant advancements. One can readily understand this concept by reviewing in the press and by observing, through the radio and television, the significant impact on daily life over the last few years of the use of the computer for all types of activities such as accessing the Internet, for interpersonal communications, to obtain news, and for the selling and purchasing of all types of merchandise. Thus, the computer has had a significant impact upon society, more than any advancement occurring previous hereto.

The keyboard is still one major tool of choice for operating a computer. A person with certain physical handicaps may have a difficult time in utilizing the standard computer keyboards. Typical keyboards, particularly since miniaturization of such keyboards has been the trend, are difficult for handicapped individuals to use. Small keys on keyboards such those found on the "lap top" style of computer are particularly troublesome. Small keyboards have become the trend rather than keyboards that would be more accommodative of people with such impairments, such as larger keyboards which more adaptable to usage. Even standard computer keyboards have many redundancies of actionable keys and have keys that are small or are so closely spaced together as to become rather unfriendly to the millions of potential users, particularly those having handicaps.

Through the present invention, by eliminating redundant keys, thereby allowing more space for keys to be made larger, by spacing the keys further apart, by incorporating key guards around individual keys, by changing the concavity of the key surface to a larger cavity and thereby increasing the visible symbol size, the inventor provides for usage of computer keyboards by the handicapped persons, who would ordinarily not be able to undertake such usage.

SUMMARY OF THE INVENTION

This invention contemplates the formation of a barrier free computer keyboard which is designed for persons that are handicapped, or have other physical impairment, but primarily for that type of individual that has more spastic hand movements, cerebral palsy, Parkinson's disease, quadriplegics who have limited mobility and control of hand movements, persons with tremorous hands, arthritic patients who have restricted mobility in their hands, patients with multiple sclerosis, muscular dystrophy patients, stroke victims, and any other victims of poor neuromuscular development or control of their hands, and even persons with poor vision.

Accordingly, the primary object of this invention is to make the computer more accessible to those individuals who are physically or visually impaired through the use a manageable and adaptive keyboard, the type that is thus far unavailable in the art.

Therefore, another principal object of this invention to provide a keyboard with more compatible size keys that may be more easily accommodated by the handicapped person, during usage of a computer, or other keyboard instrument.

Another object of this invention is to provide a keyboard where the redundant type of keys may be eliminated, to add additional space for the enlargement of the remaining keys, to facilitate their usage by the physically impaired.

Still another object of this invention is to provide greater sized control keys at the bottom of the keyboard, and which are more frequently used by the operator, when using the computer.

Still another object of this invention is to provide a keyboard in which its keys may be formed with greater concavity, or be somewhat cup shaped, to allow for greater control by the handicapped person when applying such keys when operating the keyboard for a computer.

Yet another object of this invention is to provide for a keyboard that may include dividers, around each key, so as to assure that the user can be guided and directed towards usage of the proper key, during application of the keyboard. Generally stated, a keyboard is provided which eliminates the redundancy type of keys that normally may be found the standard keyboard utilized with most computers. By eliminating such additional keys, the size of the remaining keys for the keyboard can are enlarged, spaced apart a greater distance, or may have barriers arranged between them, to assure that the person with one of the identified impairments can more easily attain access to the desired key for contact and depression, and minimize the mistakes that normally occur during their usage of the standard type of computer keyboard. In addition, the various control keys, such as the shift, return, and related type of keys that are normally found upon the levels of the keyboard, can likewise be enhanced in size, to facilitate that more facile usage by the type of user as described above.

These and other objects may become more apparent to those skilled in the art upon reviewing the summary of the invention as provided herein, and upon a study of the description of its preferred embodiment, in view of the drawings.

BRIEF DESCRIPTION OF THE DRAWINGS

In referring to the drawings,

FIG. 1 is a top plan view of the computer keyboard of this invention, the keyboard shown smaller than actual size;

FIG. 2 is a cross-sectional view of a key made with concavity with partition to facilitate focused usage and application of the keys of the computer keyboard; and FIG. 3 is a plan view of one of the keys, and the partitions provided between and around each key, to aid the handicapped person in the usage and application of the keyboard of this invention.

Corresponding reference numerals indicate corresponding elements throughout the various drawings.

DESCRIPTION OF THE PREFERRED EMBODIMENT

Figure 4:
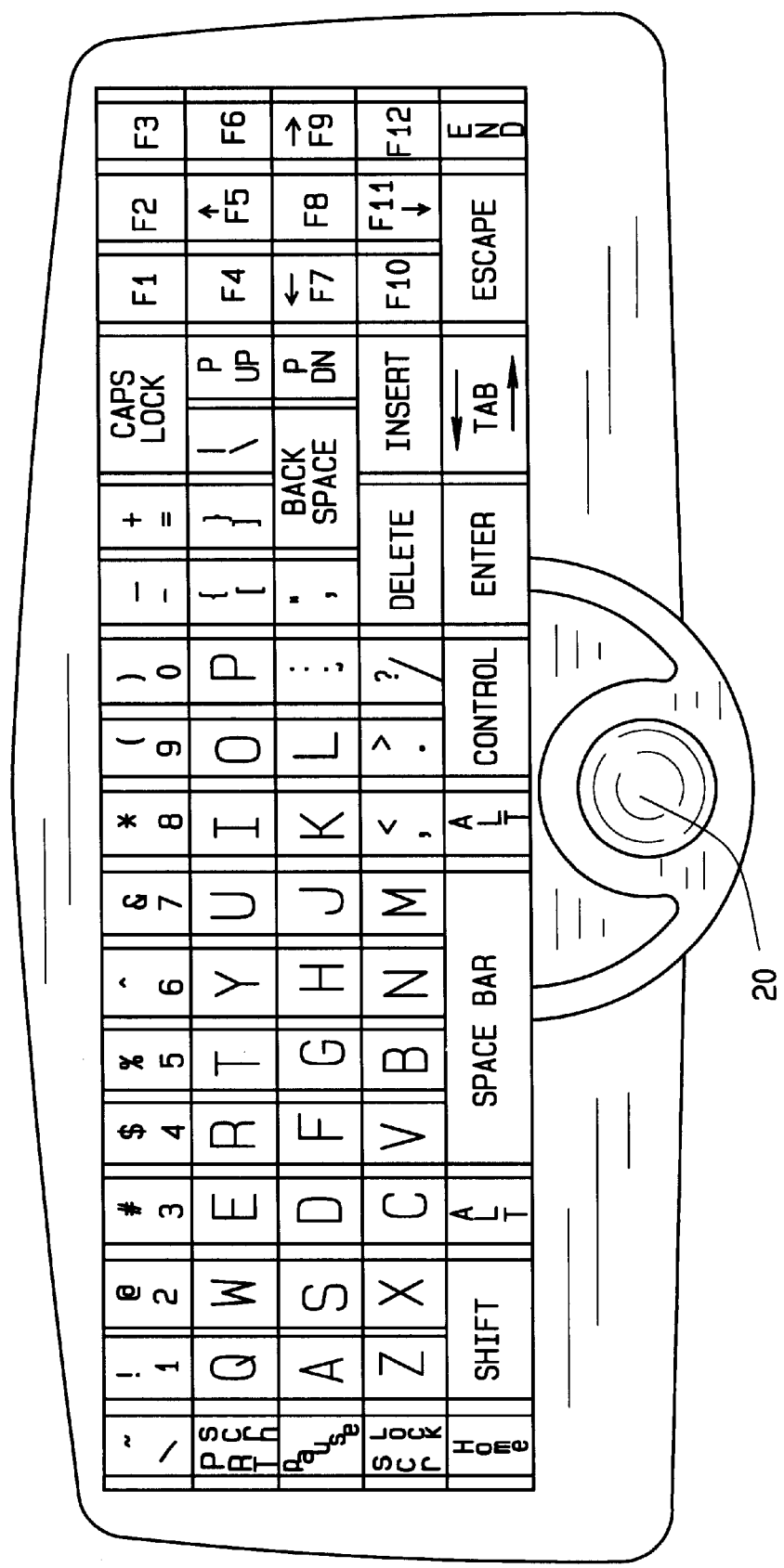
FIG. 4 shows the keyboard incorporating an integral track ball for the computer.

In referring to the drawings, and in particular FIG. 1, there is shown the novel keyboard of this invention indicated by reference numeral 10. Keyboard 10 is of the type used to perform computer functions on a typical computer, not specifically shown in the drawings but known to the art. The novel keyboard 10 can be used by any individual but is particularly well adapted for use by persons with reduced manual dexterity, such as a handicapped or debilitated users such as those described above. As can be noted, the keyboard 10 includes an array of the standard type of keys K as normally found upon a keyboard, arranged in rows forming a predetermined pattern on the keyboard. The keys are used to perform typical computing functions, such as data input, word processing, communications or the like. It will be noted that the array of keys of novel keyboard 10 has many of the redundant keys removed, resulting in only one key for a given function, in order to provide greater space on the keyboard for the enlargement of the necessary keys, as shown and described herein. It will be appreciated that one key may perform more than one function, but there are not multiple keys capable of performing the same function.

Generally, the prior art keys employed on standard keyboards normally have dimensions of approximately ½ inch in width, by 9/16 inch in height. The keys K of the keyboard of the present invention, due to the additional spacing of available within the parameters of the overall of a standard size keyboard afforded by the elimination of the redundant keys, are preferably are in the range of ¾ inch wide, by 1 inch in height, for the standard characters, such as the letter and number keys for the keyboard of this development. In addition, to the standard character keys, the control keys also are made of an enhanced size, and each may be described as follows. The shift key SK, tab key TK, caps lock key CL, inert key I, delete key D, control key C, and the ALT key A are each formed approximately 1 inch in height, and 1¾ inches in width. The space bar B is formed approximately 3¾ inches in width, and 1 inch in height.

The size of the keyboard 10 preferably approximately 19 inches wide, by 7½ inches in height, and has a depth, to accommodate the keys K, of approximately 1½ inches thick. The reduction in the number of keys for this keyboard, provides a keyboard with seventy-seven (77) keys, as distinct from the normal keyboard that has approximately one hundred four (124) such keys.

In addition, and as can be seen in FIG. 2, each key K of this invention will be designed having a cup shaped cross section, with some concavity approximate its center, in order to facilitate the movement of the fingers and positioning within the keys during use. Furthermore, and as can be seen in FIG. 3, each key K will be contained within a separating partition 12 having two vertical components 14 and two horizontal components 16, as can be noted. The edges 18 of each key K will be approximately ⅛ inch (See D,FIG. 3) below the partition components, so as to further facilitate the guidance of the fingers of the handicapped user into the region of each key, to assure accuracy in their typing, when utilizing the computer keyboard of this invention. The keys K of this invention, with their partitions 12, are specifically designed to allow the fingers slip into them, without touching another or adjacent key. The vertical and horizontal key partition components 14, 16 respectively, guard each of the adjacent keys, to prevent their accidental actuation, during usage of the keyboard. Thus, in the preferred embodiment the partition components are approximately ⅛ inch higher than each key K. The keys themselves have a preferred thickness of approximately ½ inch, or greater.

FIG. 4 shows a similar type of keyboard to that as previously described in FIG. 1, but in this particular instance, the keyboard incorporates an integral track ball for use for moving the cursor about the computer screen, for the computer, upon which this keyboard is applied. The track ball is shown at 20.

Variations or modifications to the subject matter of this invention may occur to those skilled in the art upon reviewing the disclosure as provided herein. Such variations, if within the spirit of this development, are intended to be encompassed within the scope of the invention as described herein. The description of the preferred embodiment as set forth herein, and as shown in the drawings, are provided for illustrate purposes only.

What is claimed is:

1. An improved computer keyboard to facilitate usage by persons with reduced manual dexterity, comprising:

an array of keys arranged in predetermined rows on the keyboard, each said key of the array being approximately one inch high (1") and approximately one and three fourths inches wide (1¾"), each said key having a depression formed in the surface thereof, the array of keys including only one key capable of performing a function;

an integral partition formed of the computer keyboard around each said key of the array, each said partition extending approximately one-eighth inch (⅛") above the surface of the key so as to guide the persons finger to an approximate key and to prevent actuation of an adjacent key;

the array of keys includes approximately seventy seven or fewer keys;

the keyboard having dimensions of approximately nineteen inches (19") in width and approximately seven and one half inches (7½") in heighth;

the keyboard further comprising a space bar, said-space bar being located in the lower most row of the array of keys; said keyboard incorporating an integral track ball, said track ball being located below the lower most row of keys in the array of keys arranged in predetermined rows on the keyboard, and an integral partition formed of the keyboard surrounding the integral track ball to provide for guiding of the user's fingers to the track ball during its application by the user having impaired use of the hands and fingers.

2. The computer keyboard of claim 1 and where in the barrier means surrounding the integral track ball and extending integrally and arcuately downwardly from the lower row of the array of keys and the provided space bar.

* * * * *